No. 792,433. PATENTED JUNE 13, 1905.
A. B. MANCHESTER.
CONNECTING DEVICE.
APPLICATION FILED MAR. 16, 1905.
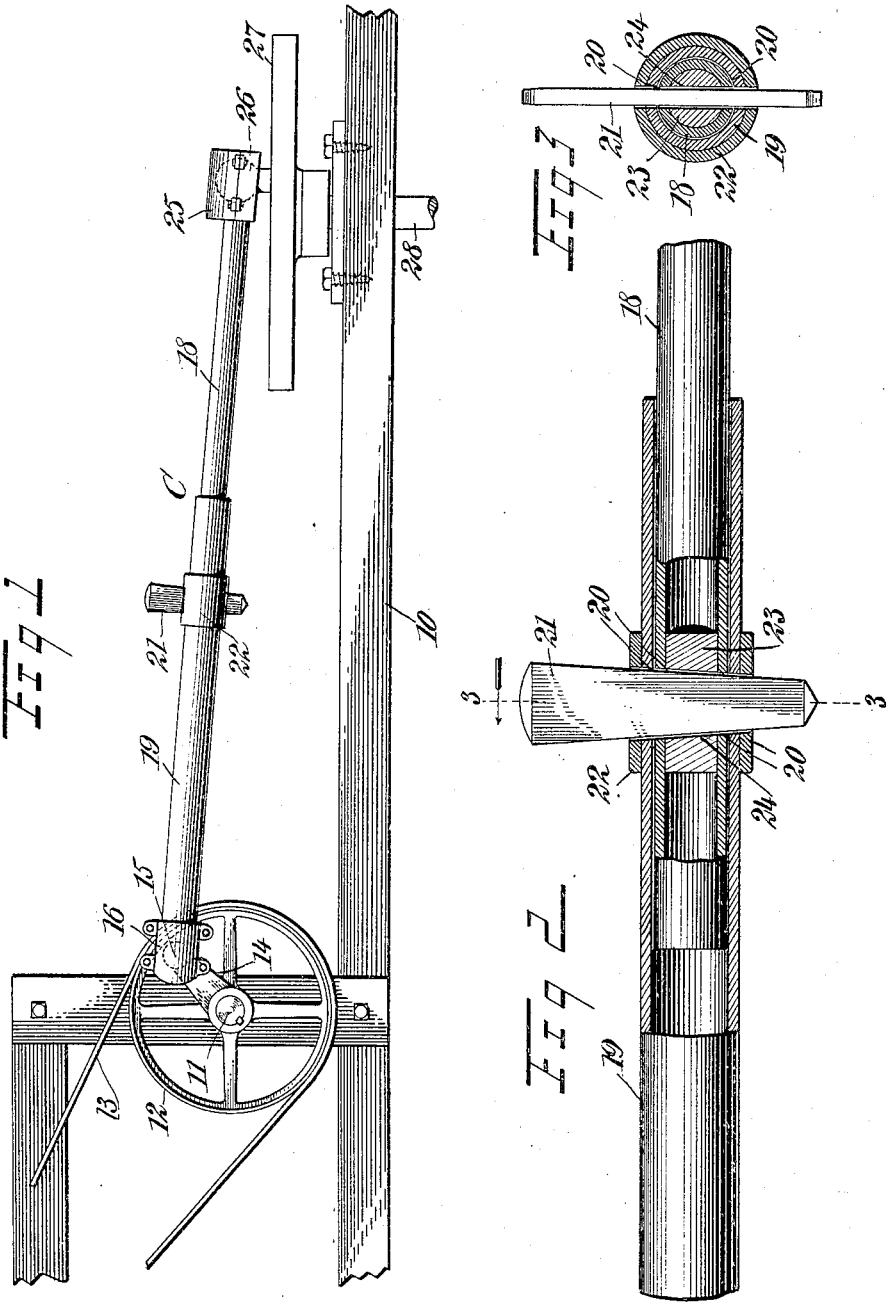
WITNESSES:
INVENTOR
Ansel B. Manchester
BY
ATTORNEYS No. 792,433. Patented June 13, 1905.

UNITED STATES PATENT OFFICE.

ANSEL B. MANCHESTER, OF FINDLAY, OHIO.

CONNECTING DEVICE.

SPECIFICATION forming part of Letters Patent No. 792,433, dated June 13, 1905.

Application filed March 16, 1905. Serial No. 250,420.

*To all whom it may concern:*

Be it known that I, ANSEL B. MANCHESTER, a citizen of the United States, and a resident of Findlay, in the county of Hancock and State of Ohio, have invented a new and Improved Connecting Device, of which the following is a full, clear, and exact description.

My invention relates to devices for connecting various elements, being particularly adapted for use in connection with the pumping powers of oil-wells and the like. Its principal objects are to provide a simple and strong device of this class which may be readily disconnected.

It consists in the various features and combinations hereinafter described and claimed.

Reference is to be had to the accompanying drawings, forming a part of this specification, in which similar characters of reference indicate corresponding parts in all the figures.

Figure 1 is a side elevation of one embodiment of my invention applied to the connecting of an oil-well-pumping power with its driving mechanism. Fig. 2 is an enlarged side elevation of the connection between the rod-sections, parts being broken away; and Fig. 3 is a transverse section on the line 3 3 of Fig. 2.

10 designates a framework in which is journaled a shaft 11, having fast upon it a pulley 12, which may be rotated at the desired speed by a belt 13, extending to any suitable source of power. Fixed to the shaft is a crank 14, these elements constituting driving mechanism for the apparatus to be hereinafter described. Upon the end of the crank is shown a ball 15, which coöperates with a socket 16, mounted upon the end of a connecting-rod C. This rod is made up of inner and outer telescoping sections 18 and 19, respectively, each of these sections being preferably of tubular form. Near their adjacent ends the sections are formed with opposite openings or slots 20, which may be brought into registration and which are preferably of such graduated size as to admit a tapering pin or key 21, serving to secure them together. To reinforce or strengthen the outer section, it may be encircled by a band 22, adjacent to and preferably surrounding the openings. To the same end the inner section may be provided with a plug or filling 23, conveniently of some soft metal, as Babbitt. Through this plug a keyway 24 is formed, extending between and in alinement with the openings through the inner section. The opposite end of the section 18 is shown as provided with a socket 25, engaging a ball 26, carried upon the upper face of a disk 27, mounted upon a shaft 28, which is journaled in the frame. This shaft may be connected to the oil-well pump, for example, and serve as the power or transmitting device therefor. When the key is in place in the openings, the sections of the rod are locked firmly together, communicating power from the driving mechanism to the crank-disk 27. If it is desired to stop the rotation of the disk while the pulley continues in motion, it is only necessary to withdraw the key, when the rod-sections will slide freely over one another.

Oil-wells as a rule are operated with gas-engines for motive power, and the stoppage of these in many cases occasions much inconvenience and delay. By employing my improved connecting device this difficulty is obviated, for if any trouble arises in either the well or the pumping power it is only necessary to withdraw the key and allow the engine to continue in operation until the matter is remedied. Then the key may be inserted in the openings and driving is resumed. This arrangement is particularly convenient in what is known as the "double pumping power," these being usually connected by solid rods running in opposite directions. If either of these becomes disarranged, the entire apparatus must remain out of operation; but by substituting the connecting-rods hereinbefore described one of them may continue the driving while the other is being repaired.

Having thus described my invention, I claim as new and desire to secure by Letters Patent—

1. A connecting device comprising a rod having telescoping sections, a reinforcing-band surrounding the outer section, and means for securing the sections together, said securing means coöperating with the reinforcing-band.

2. A connecting device comprising a rod having telescoping tubular sections, a plug situated within the inner section, and means for securing the sections together, said securing means coöperating with the plug.

3. A connecting device comprising a rod having two sections one of which extends within the other, said sections being provided with openings which may be brought into registration, a key for engaging the openings, and a reinforcing-band extending about the outer section adjacent to the openings.

4. A connecting device comprising a rod having two telescoping tubular sections provided with openings which may be brought into registration, a key for engagement with the openings, and a reinforcement situated within the inner section and extending between the openings.

5. A connecting device comprising a rod having two telescoping tubular sections provided with openings which may be brought into registration, a key for engagement with the openings, and a soft-metal plug situated within the inner section and having a keyway in alinement with the openings.

6. A connecting device comprising a rod having two telescoping tubular sections provided with openings which may be brought into registration, a key for engagement with the openings, a reinforcing-band situated about the outer section adjacent to said openings, and a reinforcement situated within the inner section and extending between the openings.

7. The combination with a transmitting device, of power mechanism, an intermediate connecting device comprising two sections one of which extends within the other, said sections being provided with openings which may be brought into registration, and a key for engagement with the openings.

In testimony whereof I have signed my name to this specification in the presence of two subscribing witnesses.

ANSEL B. MANCHESTER.

Witnesses:
A. W. CROOK,
R. RENSCH.